United States Patent
Lee et al.

(10) Patent No.: US 8,966,606 B2
(45) Date of Patent: Feb. 24, 2015

(54) APPARATUS AND SECURITY SYSTEM FOR DATA LOSS PREVENTION, AND OPERATING METHOD OF DATA LOSS PREVENTION APPARATUS

(75) Inventors: Sang Seok Lee, Seoul (KR); Tae Wan Kim, Seoul (KR); Il Hoon Choi, Seoul (KR)

(73) Assignee: Somansa Co., Ltd, Seoul (KR)

( * ) Notice: Subject to any disclaimer, the term of this patent is extended or adjusted under 35 U.S.C. 154(b) by 620 days.

(21) Appl. No.: 13/362,838

(22) Filed: Jan. 31, 2012

(65) Prior Publication Data

US 2013/0166981 A1     Jun. 27, 2013

(30) Foreign Application Priority Data

Dec. 22, 2011    (KR) ........................ 10-2011-0140585

(51) Int. Cl.
*H04L 1/00* (2006.01)
*G06F 11/00* (2006.01)

(52) U.S. Cl.
USPC ........................................................... 726/11

(58) Field of Classification Search
CPC ................................. H04L 1/00; G06F 11/00
USPC ............................................................ 726/11
See application file for complete search history.

(56) References Cited

U.S. PATENT DOCUMENTS

| | | | |
|---|---|---|---|
| 5,699,500 A * | 12/1997 | Dasgupta | 714/1 |
| 2003/0140124 A1* | 7/2003 | Burns | 709/220 |
| 2003/0145117 A1* | 7/2003 | Bhat | 709/249 |
| 2005/0177762 A1* | 8/2005 | Singh et al. | 714/4 |
| 2008/0205263 A1* | 8/2008 | Cooley et al. | 370/218 |
| 2011/0219208 A1* | 9/2011 | Asaad et al. | 712/12 |

* cited by examiner

*Primary Examiner* — William Powers
(74) *Attorney, Agent, or Firm* — Sughrue Mion, PLLC

(57) ABSTRACT

Disclosed are a DLP security system and an operating method thereof. An operating method of a data loss prevention (DLP) apparatus, comprising: converting, into packets, Ethernet signals received from a fail over device that are transmitted and received between an external network and internal network; analyzing the packets to classify the packets into first packets required to be precisely judged and second packets not required to be precisely judged; distributing and allocating a judgment job about the first packet to at least one in-line instance according to a predetermined reference; and allocating the judgment job distributed to the in-line instance in which a fail occurs to the in-line instance which is normally operated when it is verified whether there is an in-line instance which is normally operated in the case where the fail occurs in the at least one in-line instance.

11 Claims, 6 Drawing Sheets

APPARATUS AND SECURITY SYSTEM FOR DATA LOSS PREVENTION, AND OPERATING METHOD OF DATA LOSS PREVENTION APPARATUS

CROSS-REFERENCE TO RELATED APPLICATIONS

This application claims priority under 35 U.S.C. §119 to Korean Patent Application No. 10-2011-0140585, filed on Dec. 22, 2011, in the Korean Intellectual Property Office, the disclosure of which is incorporated herein by reference in its entirety.

TECHNICAL FIELD

The present invention relates to a high-performance package security system, and more particularly, to a DLP security system capable of processing and filtering a packet in an in-line method or a mirroring method and an operating method thereof.

BACKGROUND

In general, a content-aware data loss prevention (DLP) security system prevents an accident by interrupting or leaving a log when a user accesses customer's personal confidential information, an in-company confidential material, and the like through an e-mail, a messenger, a P2P, or the like.

Moreover, the DLP security system may perform content and protocol based information leakage prevent on and malignant activity interrupt on functions such as blocking accessing to unsound sites or leaving log information when the user accesses the Internet.

The DLP security system in the related art is determined and operated in a specific network matching method between an in-line method and a mirroring method during initial installation. Specifically, the DLP security system using the in-line method in the related art is installed directly on a network line to interrupt a bidirectional packet in real time or leave the log. The DLP security system using the mirroring method in the related art collects a packet receiving the bidirectional packet through a TAP without influencing an original traffic installing the TAP on the network line.

The DLP security system using the in-line method in the related art is linked with an additional fail over device (F.O.D) system against a network fail in which an Internet line is interrupted and the Internet is disconnected when a system fail occurs to continuously provide a service among existing networks through an F.O.D even though a system fail occurs, thereby making it possible to assure network availability. However, the DLP security system in the related art cannot but abandon logging and interrupting functions of personal information leakage packets during replacing or restoring the system.

The DLP security system using the mirroring method in the related art does not influence an original network at all even when the system is broken, but there is a problem in that a real-time interruption rate is deteriorated according to an Internet protocol or network components. Further, the DLP security system of the mirroring method in the related art cannot but abandon logging and interrupting functions of packets during replacing or restoring the system.

SUMMARY

An exemplary embodiment of the present invention provides a DLP apparatus, including: an Ethernet signal matching unit converting Ethernet signals received from a fail over device that are transmitted and received between an external network and an internal network; a packet processing unit classifying the packets into first packets required to be precisely judged and packets not required to be precisely judged and transferring the second packets to the fail over device to transmit the corresponding packets to an original destination; multi instance software operating a plurality of processing instances judging whether the first packets are final packets requiring log storing or session interruption by a predetermined judgment algorithm; a multi instance matching unit allocating a judgment job of the first packets to the plurality of processing instances according to a predetermined reference; and a management instance software verifying whether there is a processing instance which is normally operated among the plurality of processing instances when a fail occurs in at least one of the plurality of processing instances and command the multi instance matching unit to allocate the judgment job which is allocated to the processing instance in which the fail occurs to the processing instance which is normally operated when there is the processing instance which is normally operated.

Another exemplary embodiment of the present invention provides a DLP security system, including: a fail over device exchanging Ethernet signals transmitted and received between an external network and an internal network in an in-line method or a mirroring method; and a DLP apparatus including a processing instance judging whether log storing or interruption is required with respect to packets corresponding to the Ethernet signals and performing processing corresponding to a result of the judging, receiving the Ethernet signals in the in-line method from the fail over device controlling the fail over device in the in-line method when the processing instance is normally operated, and receiving the Ethernet signals in the mirroring method from the fail over device controlling the fail over device in the mirroring method when a fail occurs in the processing instance.

Yet another exemplary embodiment of the present invention provides an operating method of a DLP apparatus, including: converting, into packets, Ethernet signals received from a fail over device that are transmitted and received between an external network and an internal network; analyzing the packets to classify the packets into first packets required to be precisely judged and second packets not required to be precisely judged; distributing and allocating a judgment job about the first packet to at least one in-line instance according to a predetermined reference; and allocating the judgment job distributed to the in-line instance in which a fail occurs to the in-line instance which is normally operated when it is verified whether there is the in-line instance which is normally operated in the case where the fail occurs in the at least one in-line instance.

Other features and aspects will be apparent from the following detailed description, the drawings, and the claims.

DETAILED DESCRIPTION OF EMBODIMENTS

Figure 1:
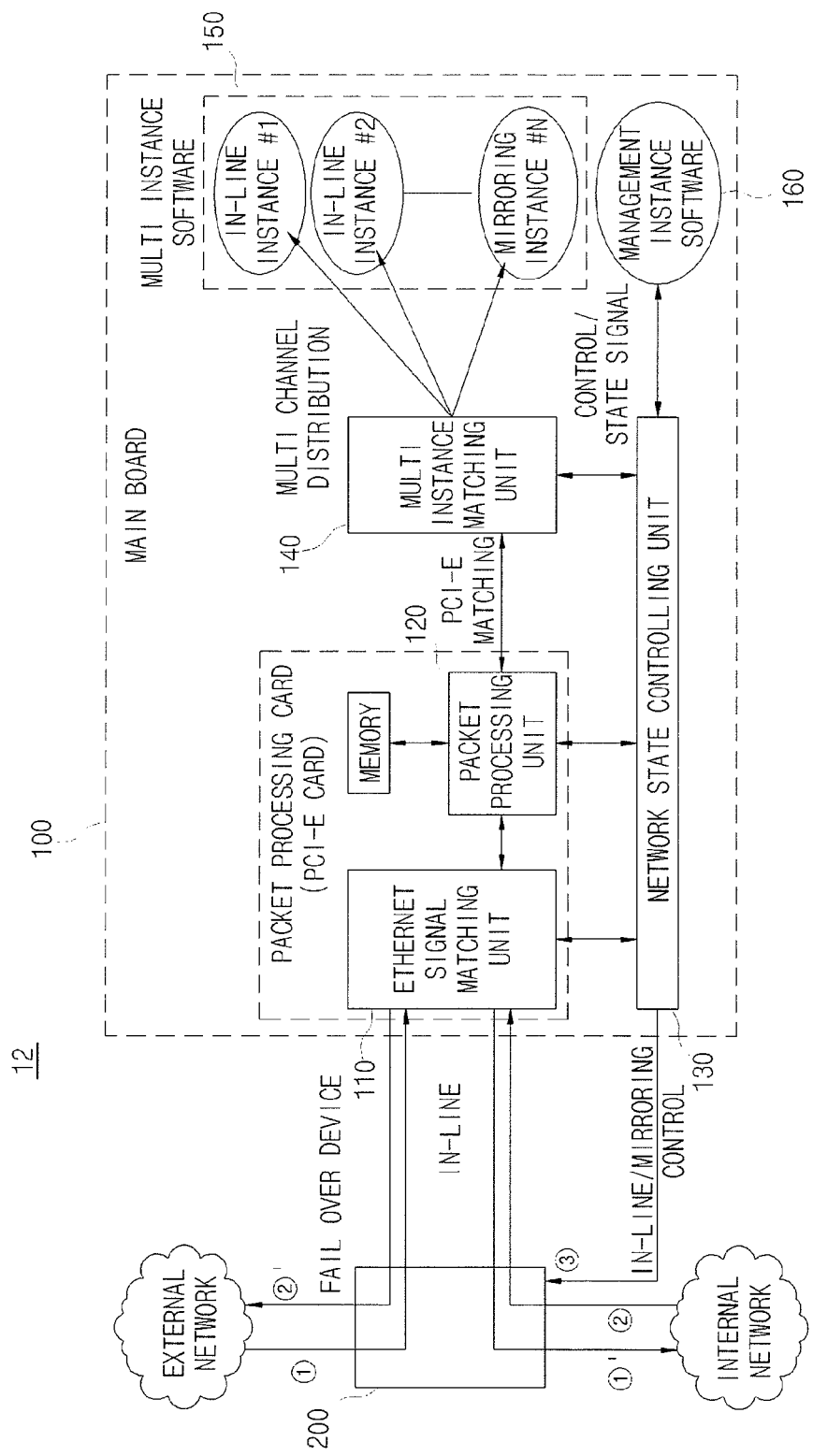
FIG. 1 is a configuration diagram showing a content-aware DLP security system according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, exemplary embodiments of the present invention will be described in detail with reference to the accompanying drawings. FIG. 1 is a configuration diagram showing a content-aware DLP security system according to an exemplary embodiment of the present invention.

As shown in FIG. 1, the content-aware DLP security system 12 includes a fail over device (F.O.D) 200 and a DLP apparatus 100.

The F.O.D 200 transmits an Ethernet signal between an external network and an internal network to the DLP apparatus 100 by an in-line method or a mirroring method according to a control of the DLP apparatus 100.

The F.O.D 200 transfers input/output packets of bidirectional (inbound and outbound) traffic to the DLP apparatus 100 operating in an in-line method during a normal operation, or receives the input/output packets from the DLP apparatus 100 to transmit the corresponding input/output packets to a destination.

Specifically, the network traffics between the external network and the internal network are divided into the in-bound traffics transferred from ① to ①' and out-bound traffics transferred from ② to ②'. The F.O.D 200 primarily transfers all of the bidirectional network traffics to the DLP apparatus 100 and the DLP apparatus 100 packet-processes the traffics and thereafter, the F.O.D 200 receives packets judged that precise judgment is not required again to transmit the received packets to an original destination network.

Meanwhile, the F.O.D 200 is switched to the mirroring method when the fail of the DLP apparatus 100 occurs and mirrors the Ethernet signal between the external network and the internal network in the mirroring method using a TAP as a network switch to transmit the mirrored Ethernet signal to the DLP apparatus 100.

The DLP apparatus 100 includes a network state controlling unit 130, an Ethernet signal matching unit 110, a packet processing unit 120, a multi instance matching unit 140, and multi instance software 150. In this case, the Ethernet signal matching unit 110 and the packet processing unit 120 may be included in PCI-e type packet processing card 110 and 120. In addition, the PCI-e type packet processing card 110 and 120 and the multi instance matching unit 140 are provided in one main board and the multi instance software 150 and management instance software 160 may be executed in the corresponding board.

The network state controlling unit 130 transfers a control command to the F.O.D 200 to control a network matching method of the F.O.D 200 by the in-line method or mirroring method. In this case, the network state controlling unit 130 may switch the network matching method according to a control of the management instance software 160.

The Ethernet signal matching unit 110 includes two Ethernet ports that transmit and receive the bidirectional network traffics, respectively and converts the Ethernet signals inputted into and outputted from the two Ethernet ports into packet types to transfer the converted packets to the packet processing unit 120.

The packet processing unit 120 analyzes, filters, pattern-matches or session-manages the inputted/outputted packets to filter effective packets required to be precisely judged. In this case, the packet processing unit 120 may be a multi core processor or multi core logic.

Specifically, the packet processing unit 120 analyzes the inputted/outputted packets, verifies information on the packets, filters the packets, pattern-matches the packets, or session-manages the packets depending on their own purposes, and transfers the effective packets required to be precisely judged for interruption or logging to the multi instance software 150 through the multi instance matching unit 140 and retransmits other packets which may be passed to the F.O.D 200 to transmit the corresponding packets to an original destination network.

The multi instance matching unit 140 may allocate a judgment job of the effective packets received from the packet processing unit 120 to the multi instance software 150 in various methods.

For example, the multi instance matching unit 140 may allocate the same judgment job to each in-line instance to perform the same judgment job, distribute and allocate the judgment job based on the traffics so as to allocate substantially the same traffics to each in-line instance, and transfer effective packet of corresponding protocols to the in-line instances that take charge of different protocols to allocate the judgment job based on the protocol of the effective packet.

The management instance software 160 may verify the traffic (processing load), an operational state of each in-line instance, or the like, notify occurrence of an error to the multi instance matching unit 140 when the error occurs in the in-line instance, and control the network matching method of the F.O.D 200 according to the operational state (the occurrence of the fail or not) of the in-line instance.

Specifically, the management instance software 160 may control the F.O.D 200 in the in-line method through the network state controlling unit 130 when the in-line instance is normally operated and control the F.O.D 200 in the mirroring method when the fail occurs in all the in-line instances.

The multi instance software 150 as software operating a plurality of instances is mounted with a judgment algorithm, a logging function, and an interruption function.

Each in-line instance and each mirroring instance judge whether the effective packets received from the multi instance matching unit 140 are packets (final effective packets) harmful or confidential information, according to the judgment algorithm and when each in-line instance and each mirroring instance judge that the effective packets are the final effective packets, each in-line instance and each mirroring instance interrupt a session corresponding to the final effective packet or store a log for the final effective packet according to a predetermined policy corresponding to the type.

Meanwhile, when the in-line instance is allocated with the judgment job for the effective packet, the in-line instance performs the corresponding judgment job in real time and processes the judgment job in the in-line method in which other processing of the corresponding effective packet cannot be performed until the judgment job of the corresponding effective packet ends. Therefore, the in-line instance generally processes a small quantity of traffics.

Since the mirroring instance performs post-processing of the effective packet while being allocated with the judgment job of the effective packet, the mirroring instance processes the judgment job in the mirroring method which does not influence even other processing of the corresponding effective packet even though the judgment job of the corresponding effective packet does not end. Therefore, the mirroring instance generally processes a large quantity of traffics.

Meanwhile, the DLP apparatus of FIG. 1 includes total n–1 in-line instances and one mirroring instance as an example, but the DLP apparatus may include a plurality of instances constituted by in-line instances and mirroring instances half and half and may be configured to include only a plurality of in-line instances or only a plurality of mirroring instances.

Figure 2A:
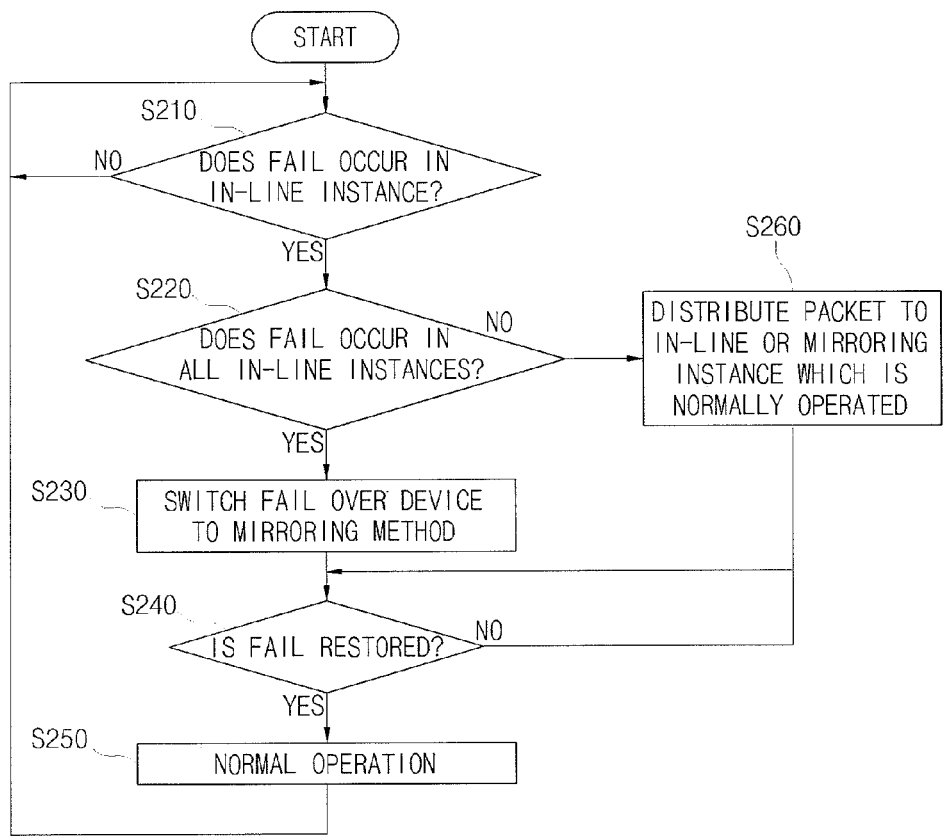
FIG. 2A is a flowchart showing an operating method of a DLP apparatus according to an exemplary embodiment of the present invention.
Figure 2B:
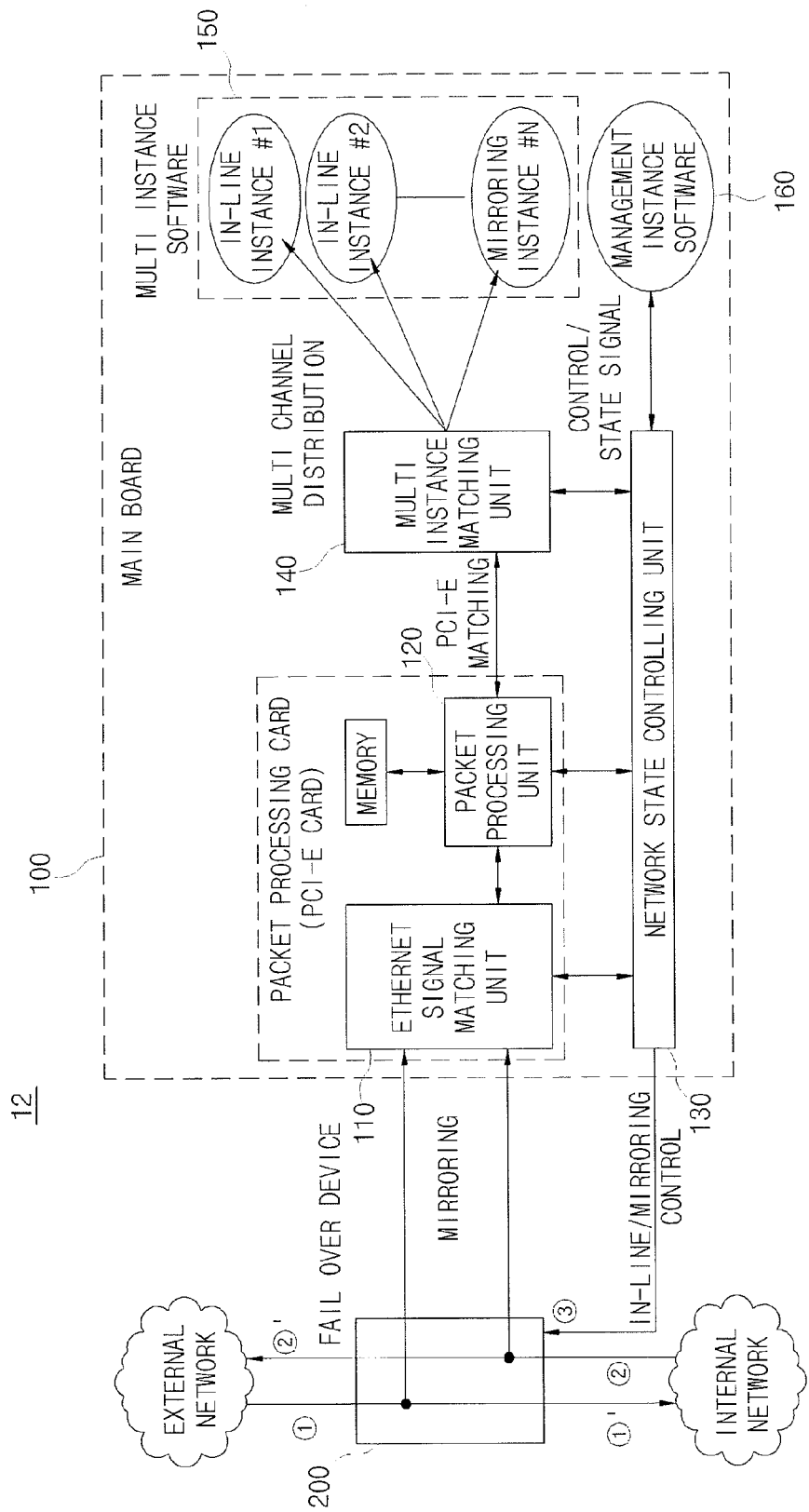
FIG. 2B is a diagram showing a fail over device set by a mirroring method according to an exemplary embodiment of the present invention.

Referring to FIGS. 2A and 2B, an operating method of the DLP apparatus according to an exemplary embodiment of the present invention when the fail occurs in the in-line instance in the DLP security system having the structure shown in FIG. 1 will be described. FIG. 2A is a flowchart showing an operating method of a DLP apparatus according to an exemplary embodiment of the present invention and FIG. 2B is a diagram showing a fail over device set by a mirroring method according to an exemplary embodiment of the present invention.

Referring to FIG. 2A, the management instance software 160 verifies whether the fail occurs in the in-line instance (S210).

The management instance software 160 verifies whether the fail occurs in all the in-line instances when the fail occurs in the in-line instance (S220). The management instance software 160 processes the corresponding judgment job by other in-line instance or mirroring instance controlling the multi instance matching unit 140 so as to distribute the judgment job of the effective packet allocated to the in-line instance in which the fail occurs to other in-line instance or mirroring instance when the fail does not occur in all the in-line instance (S260).

The management instance software 160 switches the F.O.D 200 to the mirroring method through the network state controlling unit 130 when the fail occurs in all the in-line instances (S230). Therefore, the F.O.D 200 may continuously perform the judgment job of the effective packet by the mirroring instance while continuously collecting the effective packet mirroring the network traffic to the DLP apparatus 100 and bypassing the network traffic connecting the network traffics of ① and ①' and ② and ②' by the TAP, as shown in FIG. 2B.

The management instance software 160 verifies whether the in-line instance is restored while continuously performing the judgment job by the mirroring instance (S240).

The management instance software 160 switches the F.O.D 200 to the in-line method through the network state controlling unit 130 when the in-line instance is restored (S250). Then, the F.O.D 200 is switched to the in-line method again to transfer the network traffics by the in-line method and the multi instance software 150 may normally in-line process the packets.

Meanwhile, the DLP security system including the plurality of in-line instances and at least one mirroring instance is described as an example in FIGS. 2A and 2B, but the DLP security system may include only the in-line instance or only the mirroring instance. The DLP security system including only the in-line instance allocates the judgment job allocated to the in-line instance in which the fail occurs to the in-line instance which is normally operated when even one in-line instance is normally operated. Further, the DLP security system including only the mirroring instance allocates the judgment job allocated to the mirroring instance in which the fail occurs to the mirroring instance which is normally operated when even one mirroring instance is normally operated.

Hereinafter, a packet processing method of a DLP apparatus according to an exemplary embodiment of the present invention will be described with reference to FIGS. 3A to 3C.

Figure 3A:
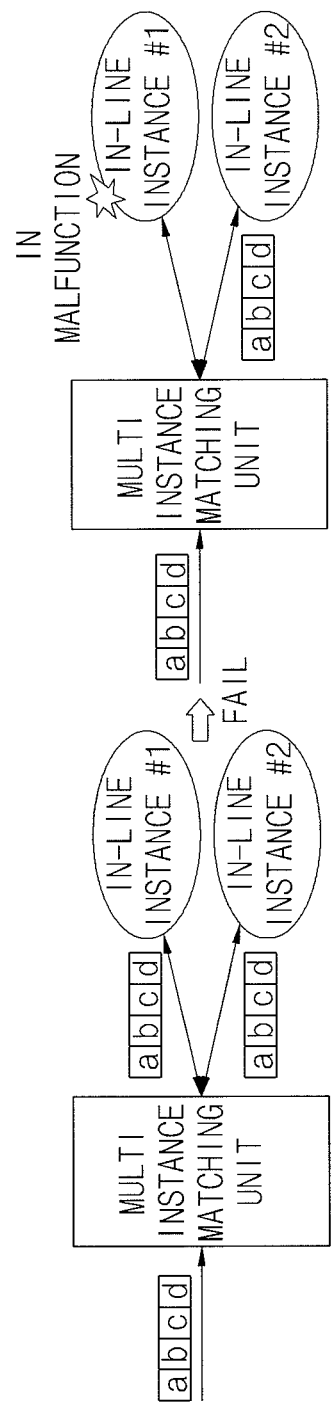
FIG. 3A is a diagram showing a duplication mode according to an exemplary embodiment of the present invention.
Figure 3B:
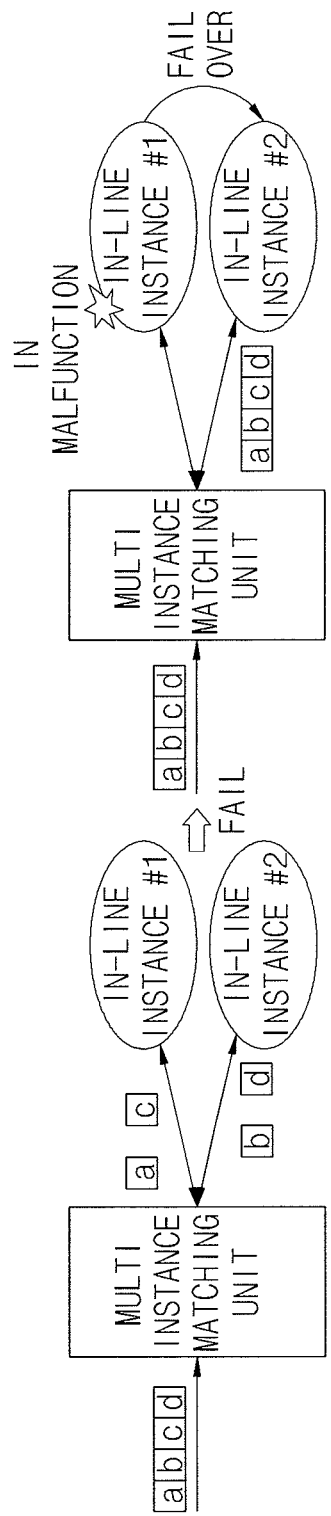
FIG. 3B is a diagram showing a load balancing mode according to an exemplary embodiment of the present invention.
Figure 3C:
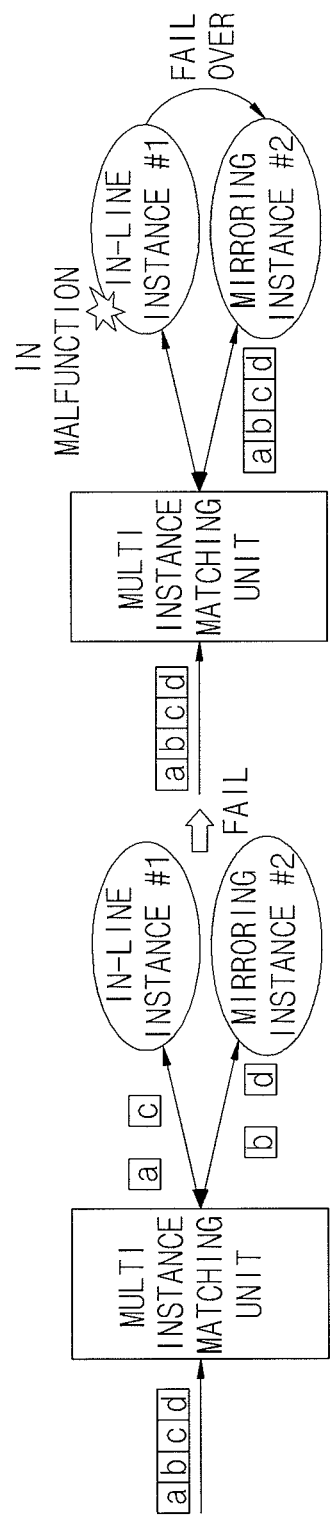
FIG. 3C is a diagram showing a dual mode according to an exemplary embodiment of the present invention.

FIG. 3A is a diagram showing a duplication mode according to an exemplary embodiment of the present invention, FIG. 3B is a diagram showing a load balancing mode according to an exemplary embodiment of the present invention, and FIG. 3C is a diagram showing a dual mode according to an exemplary embodiment of the present invention. FIGS. 3A and 3B show a DLP apparatus including two in-line instances as an example and FIG. 3C show a DLP apparatus including one in-line instance and one mirroring instance as an example.

In the duplication mode of FIG. 3A, the multi instance matching unit 140 transmits the same in-line packet to two in-line instances and each in-line instance receives the in-line packet through a channel occupied by each in-line instance. In FIG. 3A, even though a hindrance such as the fail occurs in one in-line instance, the other in-line instance may perform the judgment job, and interruption and logging functions with respect to the corresponding packet, and as a result, an reallocation of the judgment job need not when the hindrance occurs. In this case, only one in-line instance performs the judgment job, and the interruption and logging functions when one in-line instance is normally operated and the other one in-line instance may perform the judgment job, and the interruption and logging functions when the hindrance occurs in one in-line instance.

In the load balancing mode of FIG. 3B, the multi instance matching unit 140 distributes and allocates the judgment job of the effective packet to each in-line instance through load balancing. In this case, the multi instance matching unit 140 may divide and allocate the judgment job of the effective packet substantially by halves based on the traffic and may distinguish the protocol of the effective packet to distribute and allocate the distinguished protocol to the in-line instance that takes charge of processing each protocol. Even in FIG. 3B, when one in-line instance is not normally operated due to the fail, all the packets which are transmitted to the broken in-line instance are transmitted to the other in-line instance which is normally operated, and as a result, high availability can be assured by the other in-line instance.

As shown in FIG. 3C, in the dual mode in which the in-line instance and the mirroring instance are mixed, the multi instance matching unit 140 transmits the effective packet to be processed by in-line method based on the protocol to the in-line instance and transmits the other effective packet to the mirroring instance. In FIG. 3C, when the in-line instance is broken, all the effective packets are mirrored to the mirroring instance which is normally operated to assure high availability by the mirroring instance.

In FIGS. 3A and 3B, the DLP apparatus includes two in-line instances as an example, but even though the DLP apparatus includes only the mirroring instance without the in-line instance, the DLP apparatus may perform the same function.

As set forth above, according to exemplary embodiments of the present invention, an optimized service can be provided for each protocol by a fail restoring device providing an in-line method, a mirroring method, or an in-line/mirroring dual method according to software set-up, efficiency of network operating/maintenance can be improved, effectiveness of an implementation/maintenance cost can also be improved, and high availability of a network can be assured.

The implementation cost can be reduced according to ensuring high availability by multi instance software and one DLP-exclusive hardware in one system without providing a plurality of systems or a plurality of packet processing boards like the related art.

One instance software is driven per channel by driving multi-instances in one system, and as a result, another instance processes corresponding packets even though a fail occurs in one instance to assure availability of the network itself, and high availability and high reliability of a DLP function. Accordingly, the present invention can be more efficient to a recent network environment in which most of the causes of the fail are not hardware factors but software factors such as excessive traffics or the use of excessive resources.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A data loss prevention (DLP) apparatus, comprising:
an Ethernet signal matching unit converting Ethernet signals received from a fail over device that are transmitted and received between an external network and an internal network to packets;
a packet processing unit classifying the packets into first packets required to be precisely judged and second packets not required to be precisely judged and transfer the second packets to the fail over device to transmit the corresponding packets to an original destination;
multi instance software operating a plurality of processing instances that judges whether the first packets are final packets requiring log storing or session interruption by a predetermined judgment algorithm;
a multi instance matching unit allocating a judgment job of the first packets to the plurality of processing instances according to a predetermined reference; and
a management instance software verifying whether there is a processing instance which is normally operated among the plurality of processing instances when a fail occurs in at least one of the plurality of processing instances and command the multi instance matching unit to allocate the judgment job which is allocated to the processing instance in which the fail occurs to the processing instance which is normally operated when there is the processing instance which is normally operated.

2. The DLP apparatus of claim 1, wherein:
the management instance software switches the fail over device which is operating in an in-line method to a mirroring method when there is no processing instance which is normally operated,
the multi instance software further operates at least one mirroring instance apart from the plurality of processing instances,
the fail over device bypasses the Ethernet signal using an installed switch and mirrors the bypassed Ethernet signal to transfer the mirrored signal to the Ethernet signal matching unit, and
the at least one mirroring instance performs the judgment job of the first packet until at least one of the plurality of processing instances is restored.

3. The DLP apparatus of claim 1, wherein the Ethernet signal matching unit and the packet processing unit are included in a PCI-e type packet processing card.

4. The DLP apparatus of claim 1, wherein the multi instance matching unit allocates the judgment job about the same first packet to the plurality of processing instances or distributes and allocates the judgment job about the first packet to the plurality of processing instances considering a protocol of the first packet or a processing load amount of the plurality of processing instances.

5. The DLP apparatus of claim 1, wherein the multi instance software stores a log for the first packet or interrupts a session corresponding to the first packet when the first packet is judged as the final packet.

6. A data loss prevention (DLP) security system, comprising:
a fail over device exchanging Ethernet signals transmitted and received between an external network and an internal network in an in-line method or a mirroring method; and
a DLP apparatus including a processing instance judging whether log storing or interruption is required with respect to packets corresponding to the Ethernet signals and performing processing corresponding to a result of the judging, receiving the Ethernet signals in the in-line method from the fail over device controlling the fail over device in the in-line method when the processing instance is normally operated, and receiving the Ethernet signals in the mirroring method from the fail over device controlling the fail over device in the mirroring method when a fail occurs in the processing instance.

7. The DLP security system of claim 6, wherein the processing instance is at least one in-line instance performing a judgment job about the packets corresponding to the Ethernet signals in the in-line method and at least one mirroring instance performing the judgment job about the packets corresponding to the Ethernet signals in the mirroring method, and
the DLP apparatus allocates the judgment job about the packets corresponding to the Ethernet signals similarly to the at least one inline instance and the at least one mirroring instance or distributes and allocates the judgment job according to a traffic or a protocol.

8. The DLP security system of claim 7, wherein the DLP apparatus verifies whether there is an in-line instance which is normally operated when the fail occurs in the at least one in-line instance and allocates the judgment job which is allocated to the in-line instance in which the fail occurs to the in-line instance which is normally operated when there is the in-line instance which is normally operated, and controls the fail over device in the mirroring method and allocates the judgment job of the packets corresponding to the Ethernet signals to the mirroring instance when there is no in-line instance which is normally operated.

9. The DLP security system of claim 6, wherein when the processing instance is a plurality of in-line instances performing a judgment job of the packets corresponding to the Ethernet signals in the in-line method or a plurality of mirroring instances performing the judgment job of the packets corresponding to the Ethernet signals in the mirroring method, the DLP apparatus allocates the judgment job for the packets corresponding to the Ethernet signals similarly to the plurality of in-line instances or the plurality of mirroring instances or distributes and allocates the judgment job according to the traffic or protocol.

10. An operating method of a data loss prevention (DLP) apparatus, comprising:

converting, into packets, Ethernet signals received from a fail over device that are transmitted and received between an external network and internal network;

analyzing the packets to classify the packets into first packets required to be precisely judged and second packets not required to be precisely judged;

distributing and allocating a judgment job about the first packet to at least one in-line instance according to a predetermined reference; and allocating the judgment job distributed to the in-line instance in which a fail occurs to the in-line instance which is normally operated when it is verified whether there is an in-line instance which is normally operated in the case where the fail occurs in the at least one in-line instance.

11. The operating method of a DLP apparatus of claim 10, further comprising:

controlling the fail over device which is operating in the in-line method, in the mirroring method when there is no in-line instance which is normally operated; and performing the judgment job about the first packets corresponding to the Ethernet signals transferred in the mirroring method by a mirroring instance while the fail over device bypasses the Ethernet signals between the external network and the internal network.

\* \* \* \* \*